(12) United States Patent
Bauckman

(10) Patent No.: US 7,614,425 B2
(45) Date of Patent: Nov. 10, 2009

(54) SWIMMING POOL CLEANERS AND OVERMOLDED COMPONENTS THEREOF

(75) Inventor: Mark Bauckman, Carlsbad, CA (US)

(73) Assignee: Zodiac Pool Care, Inc., Vista, CA (US)

( * ) Notice: Subject to any disclaimer, the term of this patent is extended or adjusted under 35 U.S.C. 154(b) by 61 days.

(21) Appl. No.: 11/656,672

(22) Filed: Jan. 23, 2007

(65) Prior Publication Data

US 2007/0169823 A1     Jul. 26, 2007

Related U.S. Application Data

(60) Provisional application No. 60/761,479, filed on Jan. 24, 2006.

(51) Int. Cl.
  *F16K 15/14* (2006.01)
(52) U.S. Cl. .......................... 137/843; 15/1.7
(58) Field of Classification Search ................ 137/493, 137/843, 846, 15.7, 43, 543.23, 514.5, 285, 137/844, 859; 251/44; 15/1.7; 264/263
  See application file for complete search history.

(56) References Cited

U.S. PATENT DOCUMENTS

| | | | |
|---|---|---|---|
| 3,955,594 A | * | 5/1976 | Snow .......................... 137/493 |
| 4,642,833 A | | 2/1987 | Stoltz et al. |
| 4,742,593 A | | 5/1988 | Kallenbach |
| 5,265,297 A | | 11/1993 | Gould |
| 5,965,077 A | * | 10/1999 | Rowley et al. .............. 264/263 |
| 5,970,557 A | | 10/1999 | Supra |
| 6,286,539 B1 | * | 9/2001 | Nishi et al. ................. 137/202 |
| 6,289,915 B1 | * | 9/2001 | Nulman et al. ................ 137/43 |
| 2006/0032539 A1 | | 2/2006 | van der Meijden et al. |
| 2006/0054229 A1 | | 3/2006 | van der Meijden et al. |

\* cited by examiner

*Primary Examiner*—John Rivell
*Assistant Examiner*—Macade Brown
(74) *Attorney, Agent, or Firm*—Dean W. Russell; Kilpatrick Stockton LLP

(57) ABSTRACT

Overmolding of softer materials onto ends of rigid plastic pipes is detailed. The pipes typically are components of automatic swimming pool cleaners and connect to valves made of softer, flexible material. Because of the overmolding, flexing of the valves during operation of the cleaners does not cause significant wear of the valves in the regions where they connect to the pipes.

4 Claims, 7 Drawing Sheets

SWIMMING POOL CLEANERS AND OVERMOLDED COMPONENTS THEREOF

CROSS-REFERENCE TO RELATED APPLICATION

This application claims the benefit of U.S. Patent Application Ser. No. 60/761,479 filed on Jan. 24, 2006, the contents of which are incorporated herein by reference.

FIELD OF THE INVENTION

This invention relates to swimming pool cleaners and components thereof and more particularly, but not exclusively, to techniques for reducing wear of soft-plastic diaphragm-style valves used in certain such cleaners.

BACKGROUND OF THE INVENTION

U.S. Pat. No. 4,742,593 to Kallenbach illustrates, in its FIGS. 4 and 6, exemplary valves for use in water-interruption-type automatic swimming pool cleaners. The depicted valves, which generally are tubular in shape, form parts of the principal fluid flow paths from entrances into the cleaners to exits upstream thereof. As indicated in the Kallenbach patent, whose contents are incorporated herein in their entirety by this reference, the valves expand and contract autonomously when upstream suction is applied.

Because the valves flex in use, they typically are made of elastomeric material. Polyurethane, for example, is a soft plastic from which the valves may be formed. Regardless of the material used to form the valves, its hardness typically would comprise a value on the Shore A durometer scale.

Also as noted in the Kallenbach patent, the outlet end of each valve is designed to connect to an inlet end of an elongated, rigid tubular section or pipe. The rigid pipe continues the principal fluid flow path through the cleaner upstream of the valve. Because it is not needed to flex in use, the rigid pipe typically is made from a plastic material much harder than the plastic of the valve so as to maintain its structural integrity when subjected to suction. Consequently, the hardness of the pipe is usually a value selected from the Shore D durometer scale or harder.

Although necessary for proper functioning of the cleaners of the Kallenbach patent, the connection of a soft, flexing valve to a hard, rigid pipe is not without difficulties. In particular, as the valve moves relative to the rigid pipe, repeated contact between the two components causes the softer valve material to wear. This wear reduces overall durability of the valve and, if possible, should be avoided.

SUMMARY OF THE INVENTION

The present invention seeks to eliminate, or at least reduce, operational wear of valves such as those of the Kallenbach patent. It includes methods by which the inlet end of the rigid pipe is overmolded with a softer material for connection to the valve. Alternatively, the valve itself may be overmolded directly onto the pipe. In either circumstance, wear of the valve may be reduced without diminishing the structural integrity of the rigid pipe, as much of the relative movement occurs between two materials of similar softness.

It thus is an optional, non-exclusive object of the present invention to provide techniques for reducing wear of certain objects such as valves.

It is another optional, non-exclusive object of the present invention to provide techniques for reducing wear of diaphragm-style valves of automatic swimming pool cleaners.

It is also an optional, non-exclusive object of the present invention to provide techniques for overmolding soft plastic materials onto hard plastic materials such as rigid plastic pipes.

It is a further optional, non-exclusive object of the present invention to provide techniques for overmolding valves directly onto rigid plastic pipes.

Other objects, features, and advantages of the present invention will be apparent to those skilled in the relevant art with reference to the remaining text and the drawings of this application.

DETAILED DESCRIPTION

Figure 1:
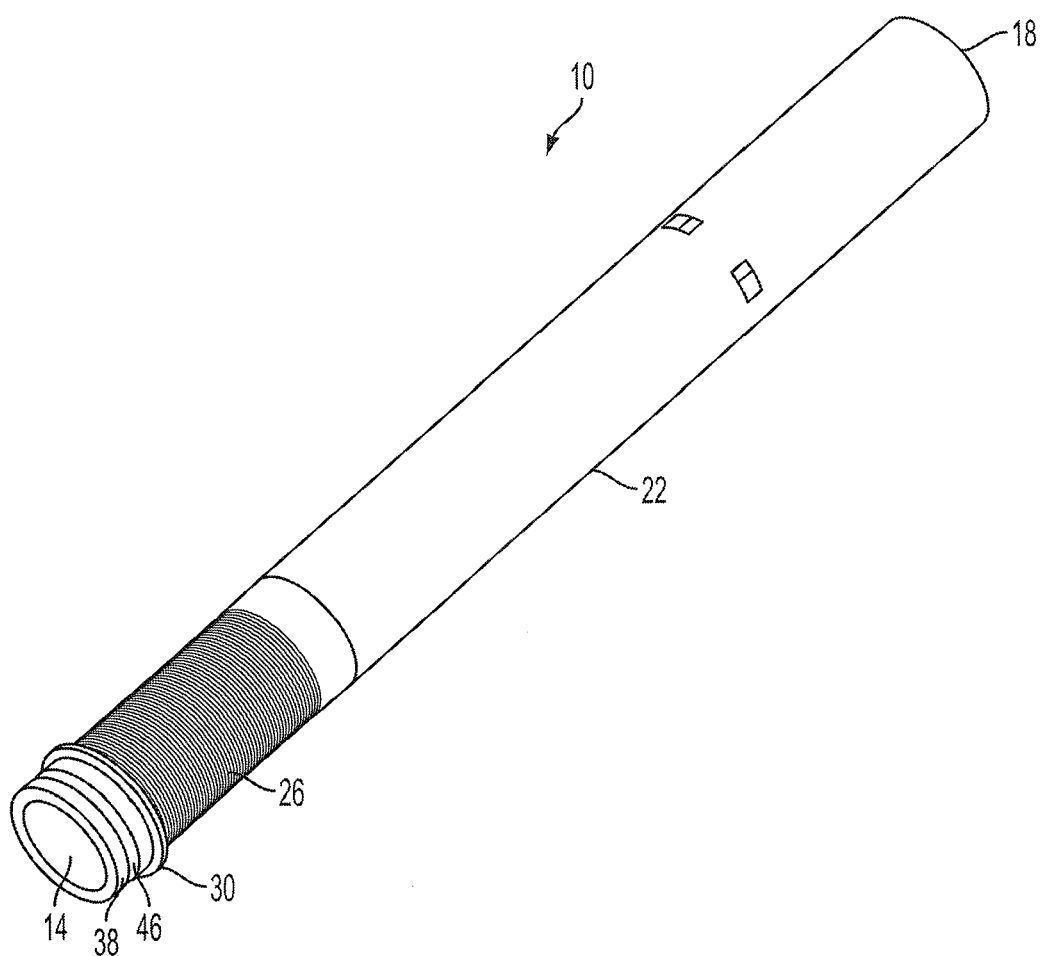
FIG. 1 is a perspective view of a rigid pipe of the present invention.
Figure 2:
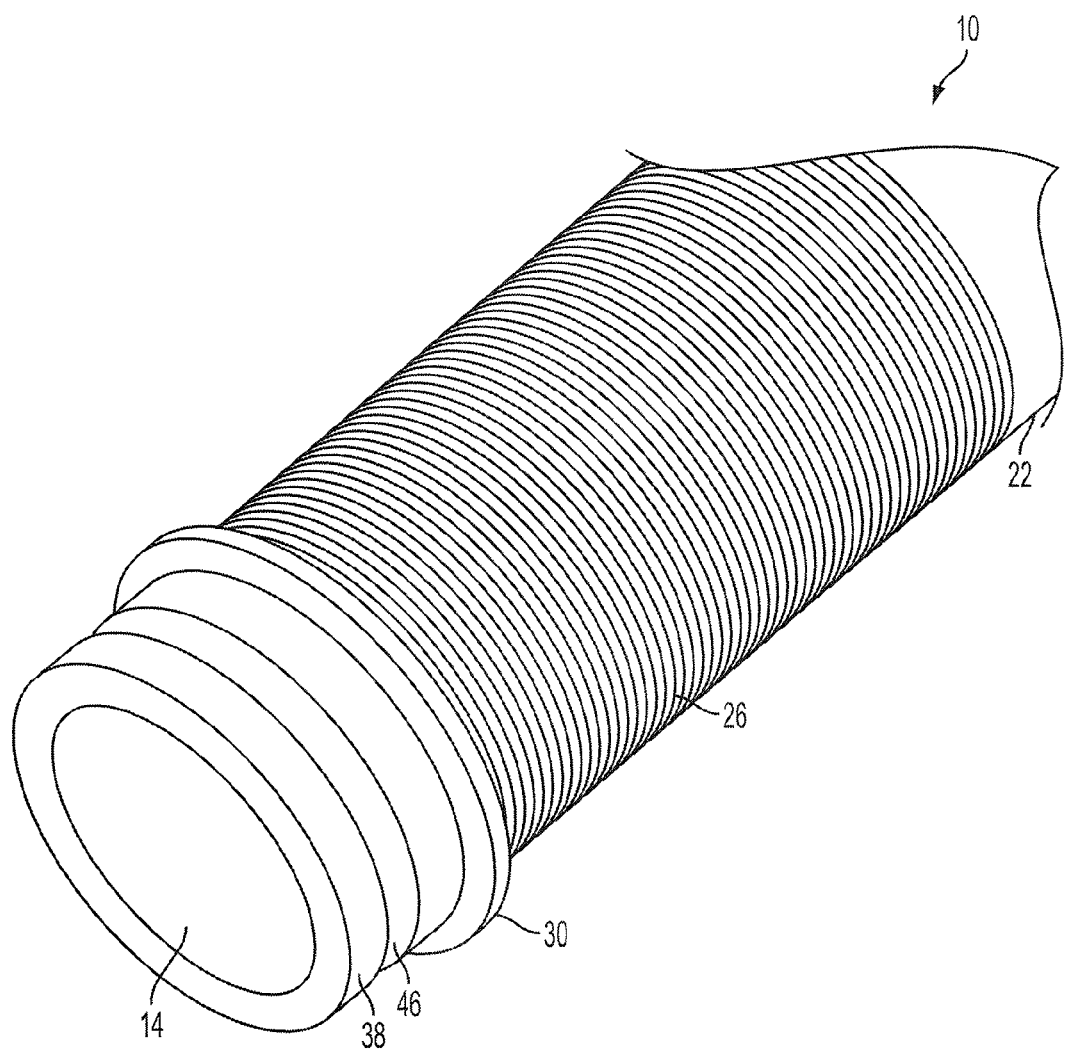
FIG. 2 is a perspective view of a portion of the pipe of FIG. 1.
Figure 3:
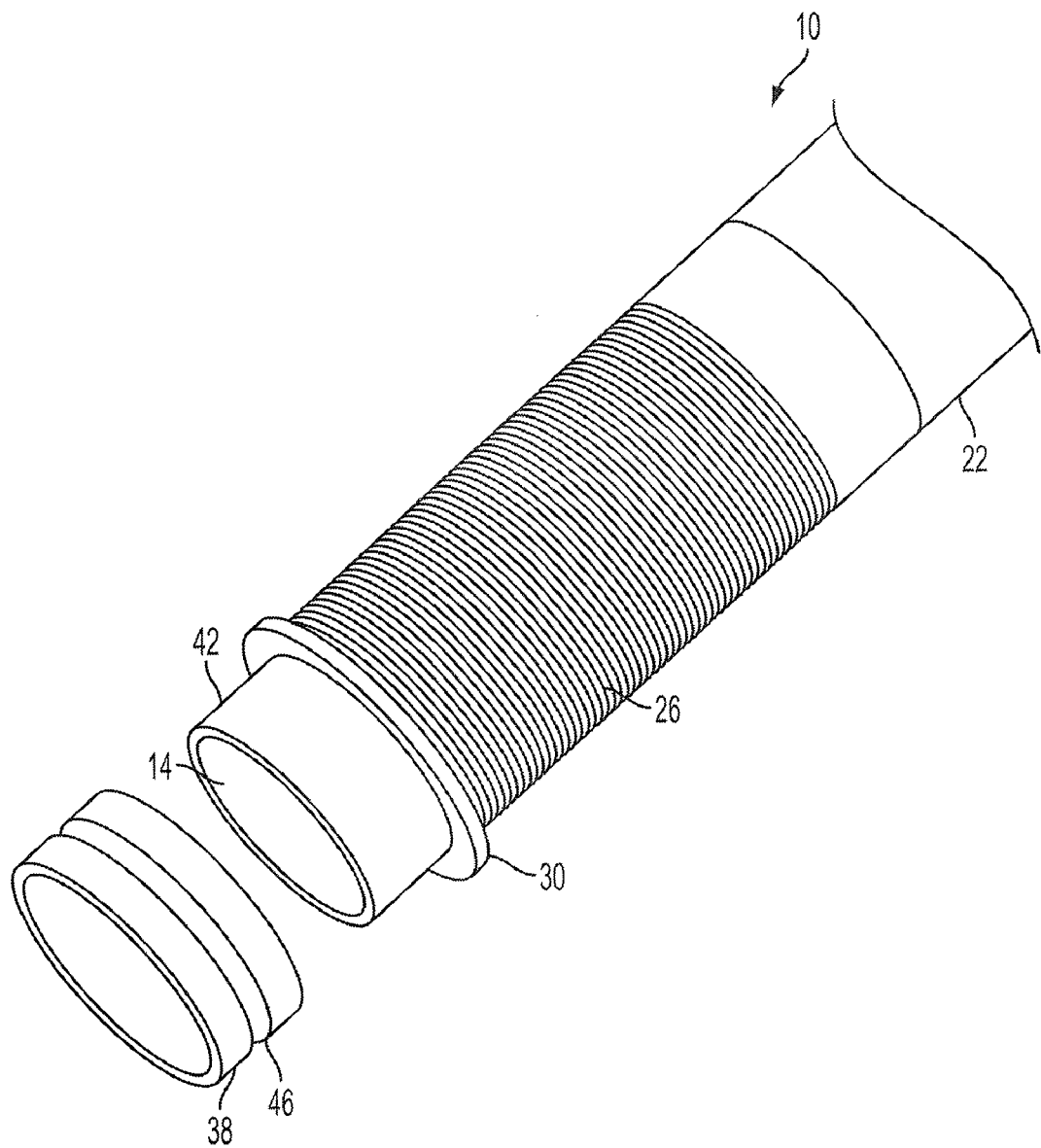
FIG. 3 is an exploded perspective view of the portion of the pipe of FIG. 2.
Figure 4:
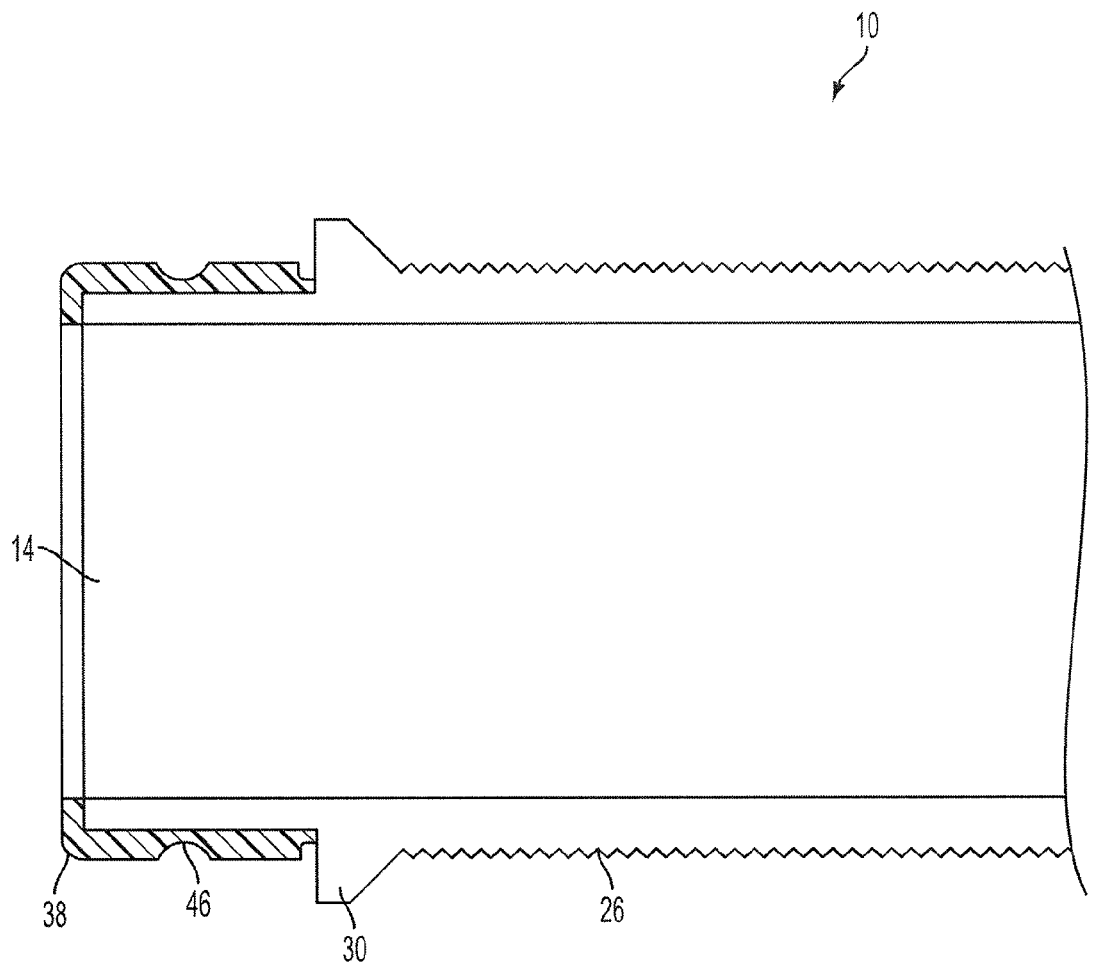
FIG. 4 is a cross-sectional view of the portion of the pipe of FIG. 2.

Depicted in FIGS. 1-5 is an exemplary pipe 10 of the present invention. Pipe 10 preferably is an elongated tubular object useful as a component of an automatic (hydraulic) swimming pool cleaner. Those skilled in the relevant art will, however, recognize that pipe 10 may be configured differently than is illustrated in FIGS. 1-5 and may be used for purposes other than as a pool cleaner component.

Pipe 10 includes inlet 14 as well as outlet 18. On exterior surface 22 of pipe 10 adjacent inlet 14 may be optional threads 26 and peripheral flange 30. If present, both threads 26 and flange 30 may facilitate attachment of pipe 10 to a body or other components of an automatic pool cleaner.

Figure 5:
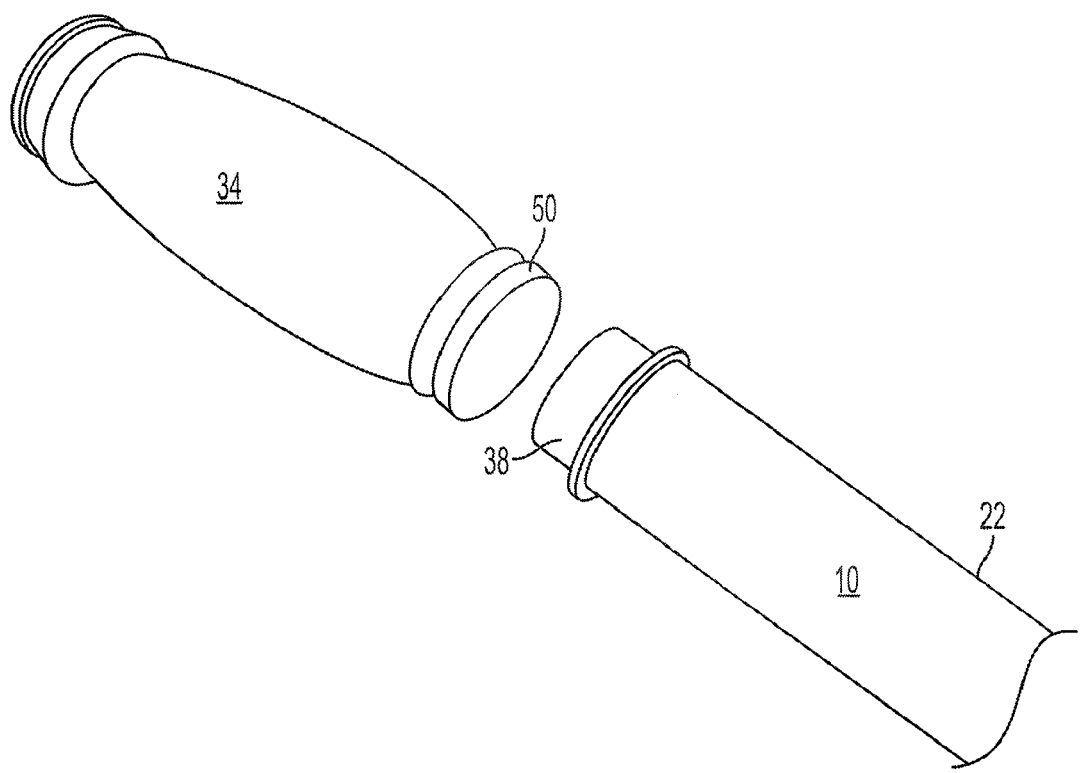
FIG. 5 is a perspective view of a portion of the pipe of FIG. 1 together with a flexible valve.

FIG. 5 also shows exemplary valve 34 associated with the present invention. Valve 34 preferably is a flexible tubular element generally similar to either of those detailed in the Kallenbach patent. Accordingly, it typically will be made of soft plastic or other elastomeric material. By contrast, pipe 10 typically will be made of hard plastic (or similar) material and designed to retain its rigidity when in operation.

Important, however, is that valve 34 and pipe 10 connect so that fluid may communicate between their interiors without leakage. This connection is difficult to make (at least) because of the non-leakage requirement, the repeated flexing of valve 34 in use, and the dissimilar hardnesses of the materials from which the valve 34 and pipe 10 are made. In particular, repeated flexing of valve 34 causes portions of the valve 34 in contact with pipe 10 to wear because of the increased hardness of the pipe 10. FIGS. 1-5 thus also illustrate interface 38 of the present invention.

Interface 38 is designed to attach to exterior surface 22 of pipe 10 in area 42 adjacent inlet 14. Such attachment may be made by gluing interface 38 to pipe 10 or by any other appropriate means. Preferably, however, interface 38 is overmolded onto area 42. In such situations pipe 10 may be molded first and then transferred to a second mold, where material forming interface 38 is injected over or around area 42.

Interface 38 may be made of any material suitable for attachment to exterior surface 22. It beneficially is of a plastic material of hardness approximately the same as that of valve 34, though. Interface 38 may if desired include peripheral groove 46, which may receive flange 50 of valve 34 so as to connect the two. In this manner, valve 34 and pipe 10 may connect without the components having to contact directly. Likewise, this connection avoids any loss of structural integrity of pipe 10, as the rigidity of area 42 remains. Accordingly, the connection resolves, to at least substantial extent, the issue of wear of valve 34 present in current commercial designs.

Figure 6:
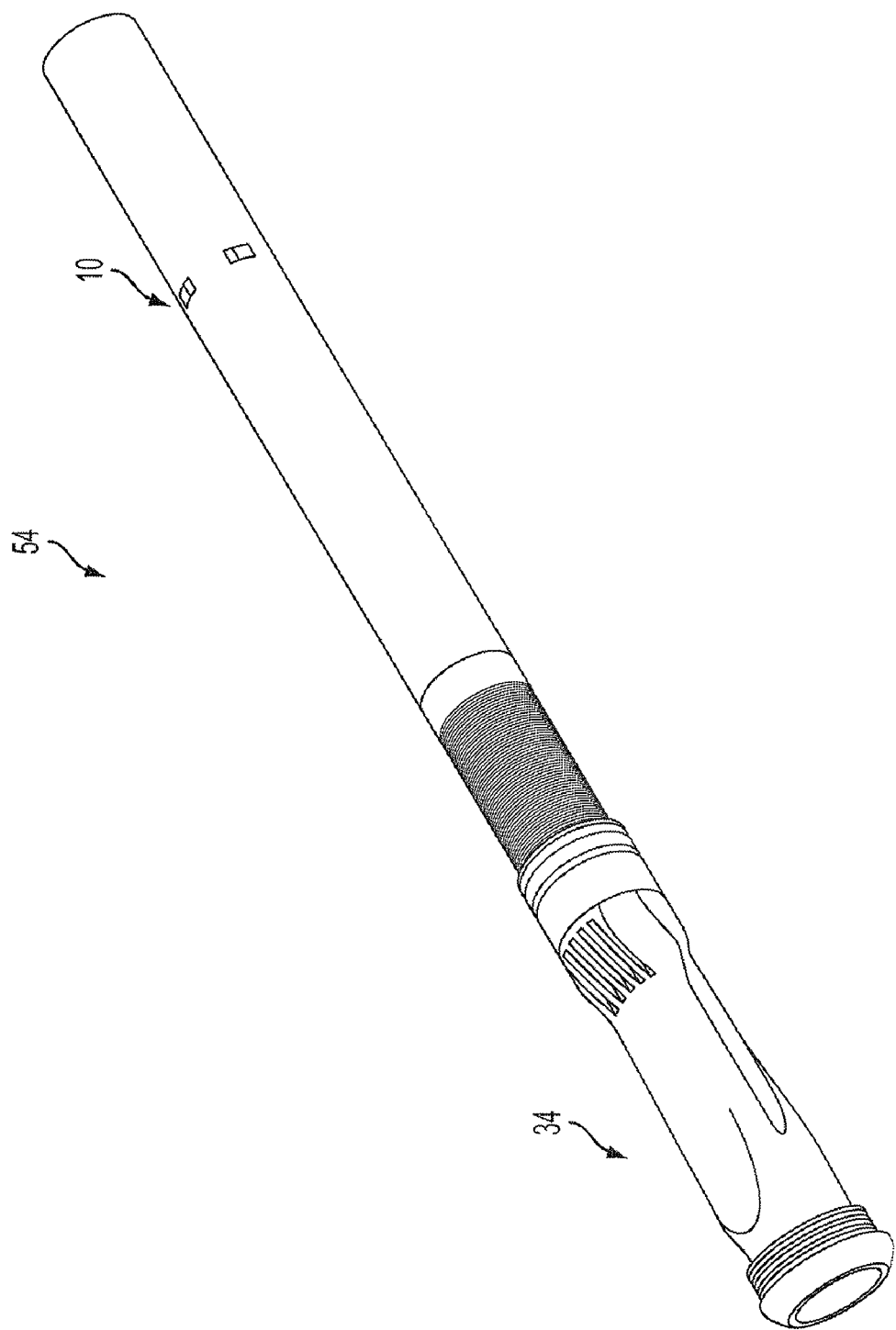
FIG. 6 is a perspective view of the pipe of FIG. 1 onto which the valve of FIG. 5 has been overmolded to form an assembly.
Figure 7:
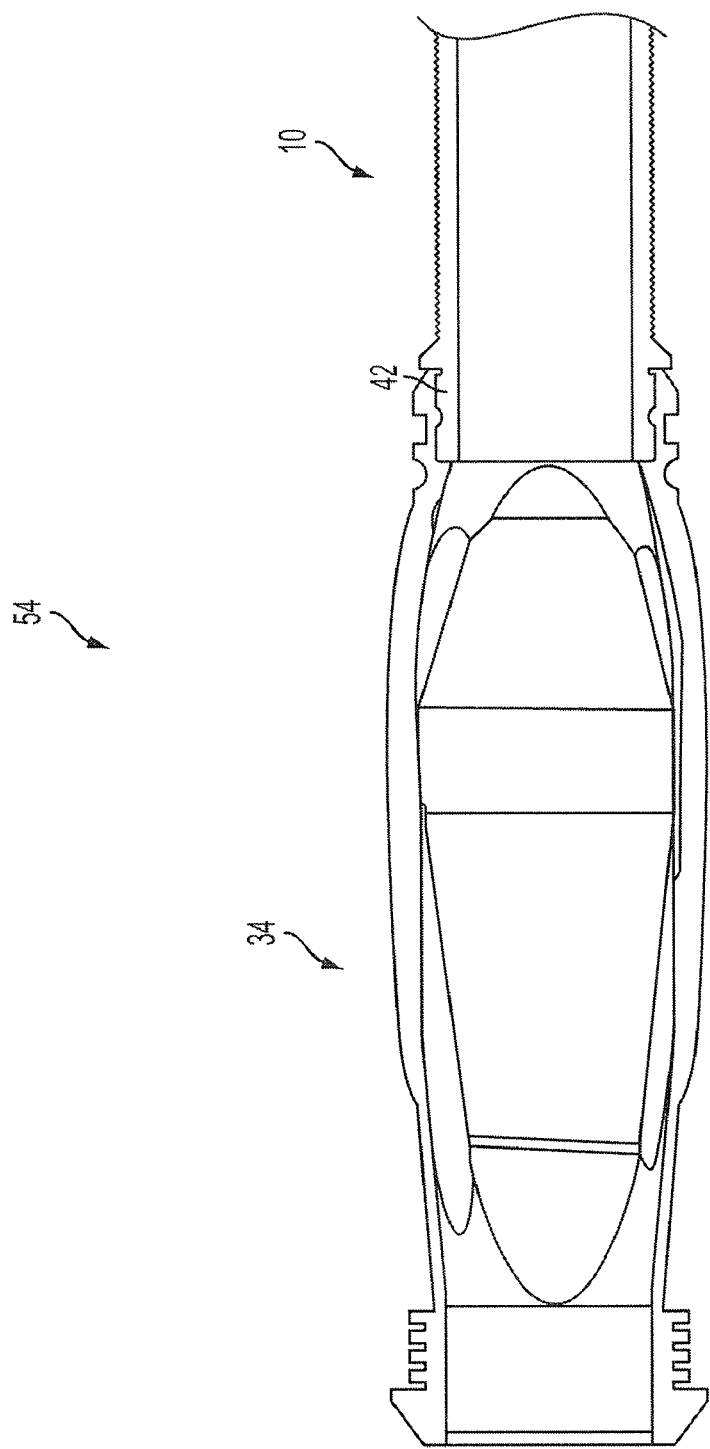
FIG. 7 is a cross-sectional view of a portion of the assembly of FIG. 6.

Alternatively, valve 34 itself may be overmolded onto area 42 of pipe 10 to form assembly 54 of FIGS. 6-7. Such direct overmolding of valve 34 onto pipe 10 avoids any need for interface 38. Thus, rather than having the second mold be used to inject material forming interface 38, it instead is utilized to inject material of valve 34 over or around area 42.

The foregoing is provided for purposes of illustrating, explaining, and describing exemplary embodiments and certain benefits of the present invention. Modifications and adaptations to the illustrated and described embodiments will be apparent to those skilled in the relevant art and may be made without departing from the scope or spirit of the invention.

I claim:

1. A method of forming components of a swimming pool cleaner, the method comprising:
   a. providing a fluid channel in the form of an inner pipe made of material having a first hardness;
   b. overmolding or gluing onto the inner pipe a tubular diaphragm valve (i) comprising an open inlet, an open outlet, and a wall having a section intermediate the inlet and the outlet that is substantially collapsed absent manipulative pressure differential across the wall and (ii) made solely of flexible material softer than the first hardness, so that at least the interior of the tubular diaphragm valve is in fluid communication with the fluid channel and the flexible softer material of the tubular diaphragm valve contacts the harder material of the inner pipe;
   c. providing an outer pipe surrounding at least a majority portion of the inner pipe; and
   d. connecting in fluid communication an operating head having an inlet with the inlet of the tubular diaphragm valve.

2. A method according to claim 1 in which the tubular diaphragm valve is overmolded onto the inner pipe and the inner pipe is molded in a mold different than the mold used for overmolding the tubular diaphragm valve onto the inner pipe.

3. A swimming pool cleaner comprising:
   a. a fluid channel in the form of an inner pipe made of material having a first hardness;
   b. a tubular diaphragm valve, (i) made solely of flexible material softer than the first hardness, (ii) overmolded onto or glued to the inner pipe so that at least the interior of the tubular diaphragm valve is in fluid communication with the fluid channel and the flexible softer material of the tubular diaphragm contacts the harder material of the inner pipe, and (iii) comprising an open inlet, an open outlet, and a wall having a section intermediate the inlet and the outlet that is substantially collapsed absent manipulative pressure differential across the wall;
   c. an outer pipe surrounding at least a majority portion of the inner pipe; and
   d. an operating head having an inlet in fluid communication with the inlet of the tubular diaphragm valve.

4. A swimming pool cleaner according to claim 3 in which the tubular diaphragm valve is overmolded onto the inner pipe.

* * * * *